United States Patent [19]

Phillips

[11] 4,378,216
[45] Mar. 29, 1983

[54] EDUCATIONAL APPARATUS EMPLOYING PLAYGROUND EQUIPMENT OR THE LIKE

[76] Inventor: Jean A. Phillips, R.R. #2, West Liberty, Iowa 52776

[21] Appl. No.: 258,118

[22] Filed: Apr. 27, 1981

[51] Int. Cl.³ .............................................. G09B 17/00
[52] U.S. Cl. ................................... 434/159; 272/113; D21/244; D21/251
[58] Field of Search ............... 434/159, 167, 171, 178, 434/157, 403; 272/113; D21/242, 243, 244, 245, 251

[56] References Cited

U.S. PATENT DOCUMENTS

| D. 73,478 | 9/1927 | Bezark | D21/244 |
|---|---|---|---|
| D. 232,452 | 8/1974 | Wormser | 272/113 X |
| D. 250,783 | 1/1979 | Dieter et al. | D21/244 |
| 1,586,960 | 6/1926 | Bowen | 434/159 |
| 2,824,389 | 2/1958 | Orebaugh | 434/167 |
| 2,886,317 | 5/1959 | Overton | 272/113 |
| 3,670,427 | 6/1972 | Stolpen | 434/157 |
| 4,007,548 | 2/1977 | Cytanovich | 434/178 |
| 4,044,476 | 8/1977 | Marsh | 434/171 |
| 4,158,921 | 6/1979 | Stolpen | 434/403 |

Primary Examiner—William H. Grieb
Attorney, Agent, or Firm—Henderson & Sturm

[57] ABSTRACT

Educational apparatus utilizing a plurality of objects of such form and size as to involve human learners, especially children, in physical activity while learning given letters of the alphabet. Each object is in a form and shape already familiar to the children by way of both appearance and name and the forms and names are selected on the basis that each object descriptive word or name contains a letter to be learned. The apparatus is especially designed to teach short vowels of the English language.

3 Claims, 8 Drawing Figures

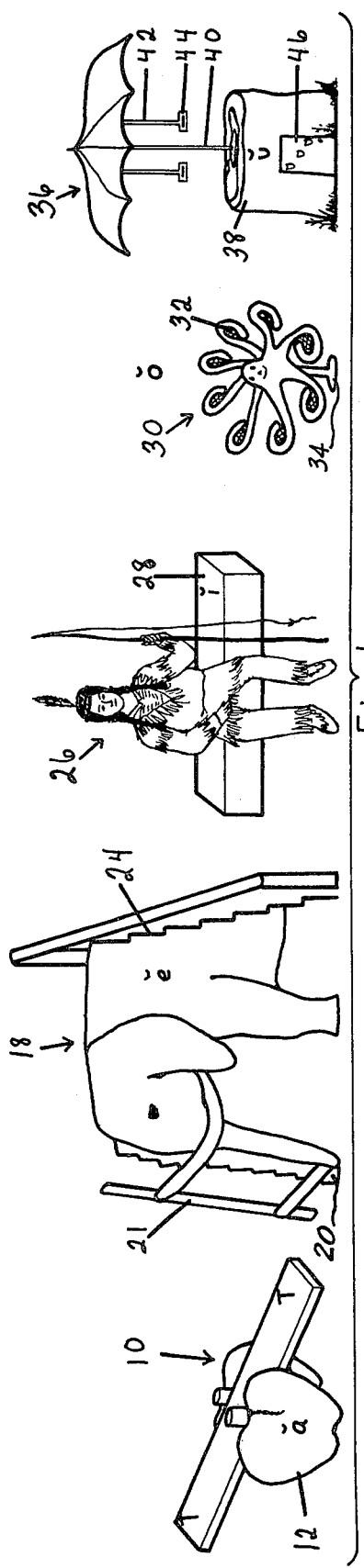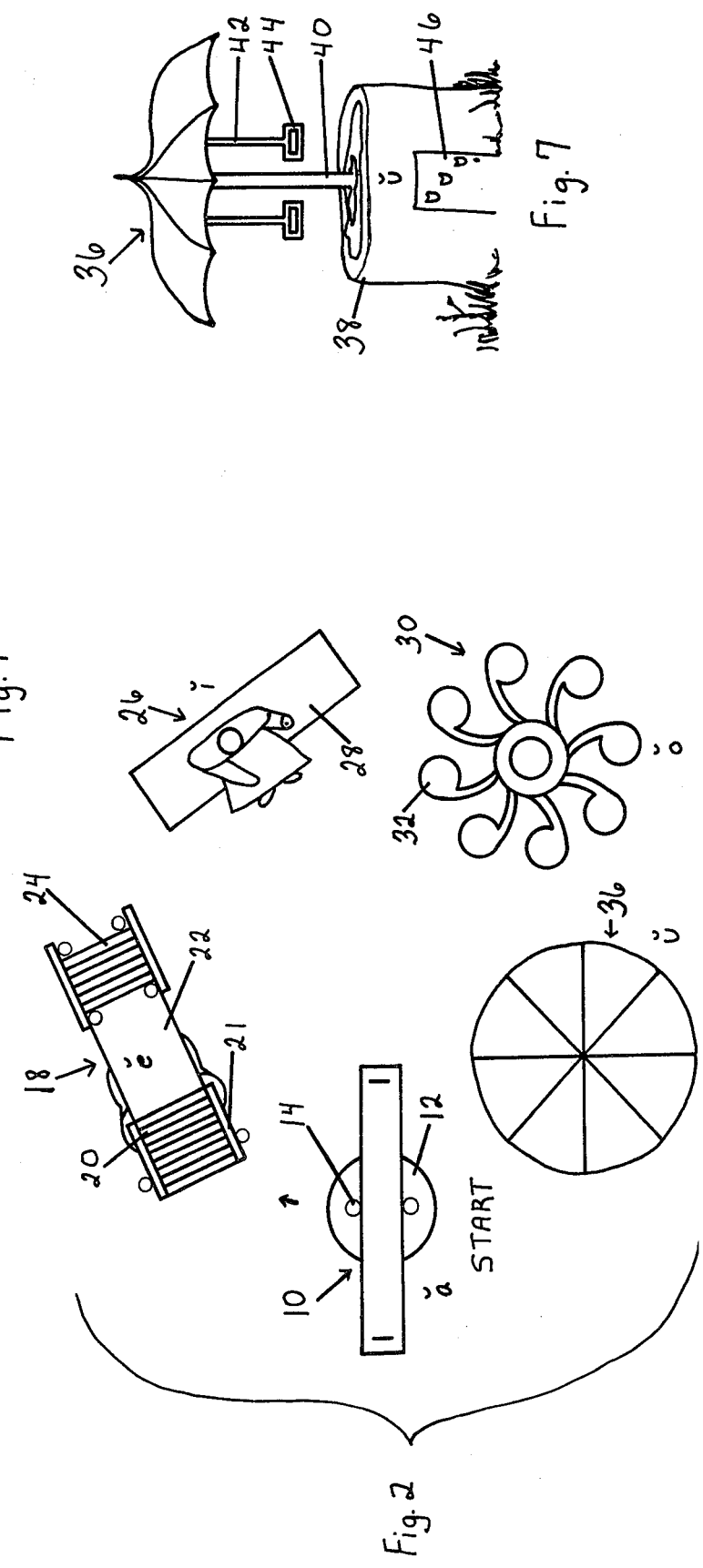

U.S. Patent  Mar. 29, 1983  Sheet 2 of 2  4,378,216
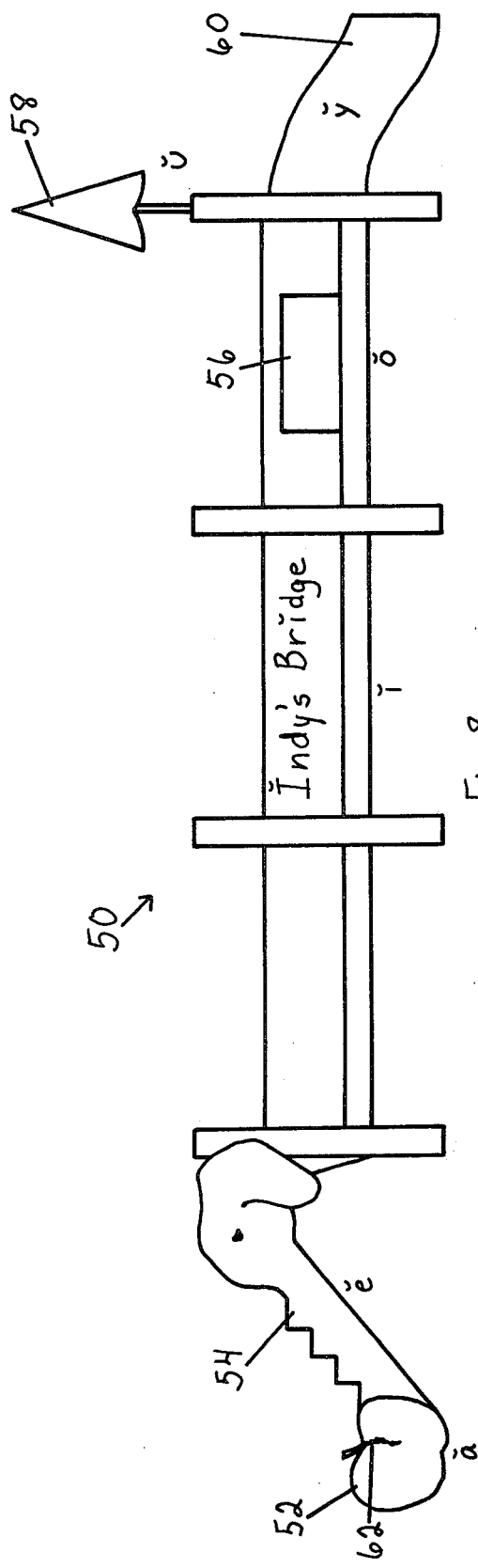
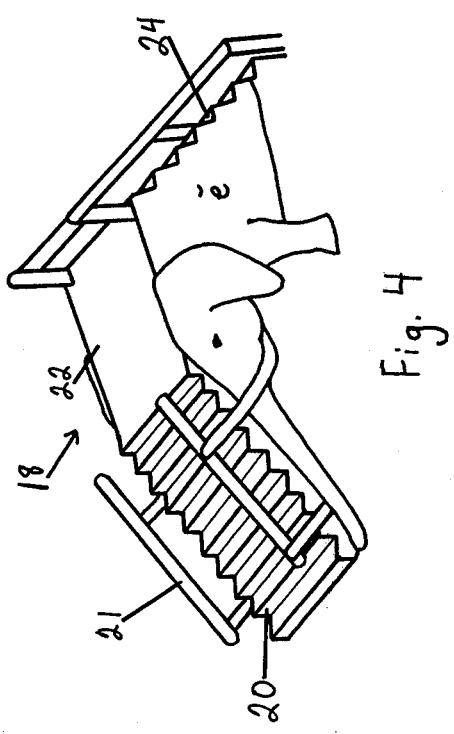
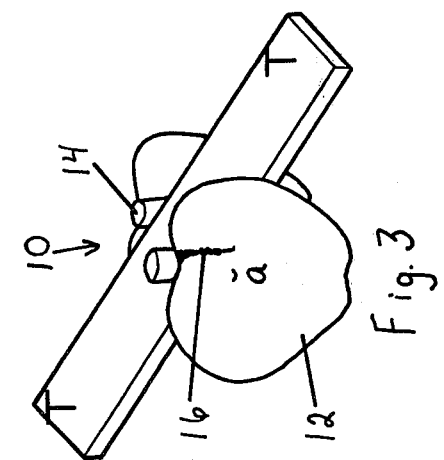

EDUCATIONAL APPARATUS EMPLOYING PLAYGROUND EQUIPMENT OR THE LIKE

BRIEF SUMMARY OF THE INVENTION

Many forms of educational devices for teaching language and parts thereof are already known, the most familiar example of which is the flash card. This example has been expanded to include other forms of objects, such as cubes, bent cards and the like, as in U.S. Pat. Nos. 2,824,389, 3,670,427, 4,044,476 and 4,158,921. Each of these, however, like other examples of presently known prior art, involve the learner visually only; although, some objects can be handled, as when they are in "puzzle" form; e.g., U.S. Pat. No. 4,044,476, supra. But none of the known prior art involves the child physically to the extent that the child derives amusement and exercise while learning, which is the basic thrust of the present invention.

It must be recognized that a word must have at least one vowel in it to be a word, and a syllable must have at least one vowel in it to be a syllable. Vowel decision making is enormous. It is preferred that the selected objects and object words be chosen in such manner that for each such object or object word the particular vowel is placed in the initial position; i.e., as the first vowel in the word, because it is more easily identifed and heard there, and its counterpart activity word transfers the matching vowel into medial position.

Usually the first words taught involve the short vowel sounds. Quite frequently, people with reading problems are diagnosed as suffering short vowel confusions in their reading decoding efforts. Something must be offered to develop a more memorable, meaningful short vowel base . . . at an early age.

Thus, this invention was created.

Experience has shown that most children, even of pre-school age, learn the alphabet, but in so doing, learn the vowels by the sounds they represent in the alphabet, i.e., the vowels are long. The present invention is devoted especially to teaching the child that vowels also have short sounds; although, the invention is not so limited in scope. In solving the problems of how best to teach proper vowel sounds, a series of objects is selected, each in a form already familiar to the child in appearance and by way of descriptive words. A significant feature of the invention is that the objects or figures are three-dimensional and of such size and shape as to embody some form of playground equipment from which the child, while learning, derives amusement and exercise. Another feature of the invention is to arrange the objects in a progressive pattern of the vowels a, e, i, o and u, which is the order of their appearance in the alphabet. The equipment is so arranged that the child progresses from object "a" through "e", "i" and "o" to object "u". Hence, preferably five objects are used, although, multiple objects may be used for some or all of the vowels. It is also an object of the invention to arrange the vowels in a circular pattern with the vowels or objects positioned in clockwise fashion. The straight-line and clockwise patterns further teach left-to-right learning, as necessarily employed when reading a word, phrase or sentence. Other features and arrangements will become apparent as preferred embodiments are disclosed in the ensuing detailed description and accompanying sheets of drawings.

It is a further object to include one or more objects representing the "y" sound, even though this sound is uniquely different from the other vowels in that it is never a vowel in the initial position but only at the end or in the middle of a word, except in some archaic word forms such as yclept, yclad, and in geographical, etc., names; e.g., Ypres. These are seldom used in present English and therefore will be ignored. The invention thus features one or symbolic displays of this "y" sound in sequence with the other five vowels, which is of course in alphabetical order as respects those vowels.

DESCRIPTION OF THE DRAWINGS

FIG. 1 is a relatively schematic illustration, on a reduced scale, of one form of object selection and arrangement, showing the straight-line pattern.

FIG. 2 is a similar view of like objects arranged in a circular pattern.

FIG. 3 is a perspective of one form of object representing the vowel short "a".

FIG. 4 is a perspective of one form of object representing the vowel short "e".

FIG. 5 represents the short "i".

FIG. 6 represents the short "o".

FIG. 7 represents the short "u".

FIG. 8 is a schematic view of a different arrangement in which selected objects are arranged in associated-series fashion.

DETAILED DESCRIPTION OF THE INVENTION

It should be observed at the outset that the objects selected for the purpose of disclosing the invention are not exclusively the only ones that could be used. Obviously, given the basics of the invention, it would be seen that there are a myriad of objects that could be used. Hence, the preferred embodiments disclosed here should be taken as representative and not limiting.

Reference will be had first to FIGS. 1 and 3 through 7 in which the series of selected objects is arranged in a straight-line pattern and progressing from "a" to "u". The representation of the first object, that exemplifying the short "a", is a see-saw 10, or "balance plank", embodying a fulcrum means 12 in the form of an apple. A better showing appears in FIG. 3 where it is seen that the apple may be in two halves secured to a pair of posts 14 that are suitably embedded in the ground. Further, the apple may appear to be "cracked" at 16, which further emphasizes the short "a" sound. In the case of the balance plank (short "a" in both words), as well as regards other objects to be described herein, it should be noted that the construction and dimensions are such as to be suitable for the class and age-grouping of children who will be using the objects or devices. The specific construction of the objects, such as selection of materials, ground supporting, etc., forms no part of the invention.

The next selected object 18 is in the form of an elephant to stress the short "e". As best seen in FIG. 4, the elephant construction is three-dimensional and has a series of steps 20 leading via fence 21 to a platform 22 and a series of steps 24 leading down from the platform to the ground. By way of illustrating the flexibility of the elephant 18, the steps 20 preferably can be ten in number (a basic math term) and the steps 24 may be termed "steps" to augment the short "e" sound in medial position.

Having progressed from the apple branch balance plank to the elephant and having again reached the ground, the child moves on to the object chosen to represent the short "i", here a three-dimensional Indian 26 sitting on an object 28 labeled "Fishing Kits" (for the short "i" sounds) (see also FIG. 5). The structure of the Indian and object 28 as to materials, ground support, etc., may be of any suitable type consistent with the safety of the children and is of such size, however, that the child may clamber over it on his way to the object 30 which represents the short "o", which object is here a whirl or merry-go-round in the form of an octopus ("octocopter") having tentacles terminating in seats 32 on which the children may sit while turning the whirl. The octopus is mounted on a pivot knob 34 suitably embedded in the ground according to accepted playground construction principles and again the type of materials, etc., is left to the designer. The octopus may be constructed to "bob" or "flop".

The final object is an umbrella 36 mounted on a stump 38, it being noted that both words use the short "u". The umbrella has an upright shaft suitably mounted in the stump and may, by way of choice, use a swivel or "hub" (not shown) to which are attached a plurality of straps 42 having handles 44 which the child may grasp to swing around the umbrella in maypole fashion. The stump may be embellished by decoration of any type, as by a door 46 which is in its shut position, the word "shut" further stressing the short "u". Also, the umbrella may include typical mechanism (not shown) for shutting and the exercise may involve instructions to the child to "shut " the umbrella.

Reference will be had now to FIG. 8, which depicts a different, albeit similarly based, arrangement. Basically, the objects are associated with a bridge 50 (short "i") which may be of a sitting or swinging (short "i's") type and which short "i" sound may be further augmented by designating the bridge "Indy's bridge". The child first walks through, over or around a three-dimensional object in the form of an apple 52 (short "a") and reaches the bridge via a combination elephant-steps-entry deck 54 (all short "e's". An object 56 in the form of an octopus box 56 (short "o's") is disposed on the bridge and may be hopped on before the child reaches an umbrella 58 (short "u") which is in shut (short "u") position or the child may be instructed to "shut" it. At the right end of the bridge is a representative form of "gym" equipment, here in the form of a hollow cylindrical slide 60 that leads to the ground. Reverting to the apple 52, the short "a" sound may be augmented by the provision of a real or imitation crack 62 (short "a"). As noted before, the vowel sounds, whether long, short or otherwise, are capable of being represented by objects capable of being constructed so as to function as exercise or playground equipment.

The "gym" slide or cylinder represents the short "y" which is at the end of the a, e, i, o, u sequence as it should be. In actual practice, the designating letters could appear directly on the respective objects themselves, and, if desired, the objects could be painted different colors. Also, if desired, the program could include a musical or motion-picture background in which the names of the objects would be pronounced. Further, some or all of the objects could be animated.

Features and advantages inherent in and encompassed by the invention, other than those specifically pointed out in the foregoing, will readily occur to those versed in the art, as will many modifications of the embodiments disclosed herein, all of which may be achieved without departure from the spirit and scope of the invention.

I claim:

1. Apparatus for a supplementary teaching aid to expose learners to the correct pronunciation of given letters of the alphabet, including means in the form of symbolic representations of objects respectively described by words familiar to the learner from prior experience and respectively containing the letters to be learned, characterized in that the letters are vowels and the objects are three-dimensional figures respectively in the form of playground equipment and the objects are arranged in the order of a, e, i, o and u.

2. Apparatus according to claim 1, in which the objects are arranged in a circular pattern in which the vowels are in clockwise order starting with the letter a.

3. Apparatus according to claim 1, further characterized in that a bridge-like structure is provided for the learner to cross and certain of the figures are arranged relative to the structure such as to require the learner to traverse said figures in the aforesaid order incident to crossing the structure.

* * * * *